US00RE48052E

(19) United States
(12) Reissued Patent
Durante et al.

(10) Patent Number: US RE48,052 E
(45) Date of Reissued Patent: Jun. 16, 2020

(54) METHOD OF EMBEDDING PHOTOCATALYTIC TITANIUM DIOXIDE IN CONCRETE STRUCTURES TO REDUCE POLLUTANTS VIA PHOTOCATALYTIC REACTIONS

(71) Applicant: Pavement Technology, Inc., Westlake, OH (US)

(72) Inventors: Colin Durante, Mansfield, OH (US); Craig Higgins, San Diego, CA (US)

(73) Assignee: Pavement Technology, Inc., Westlake, OH (US)

(21) Appl. No.: 16/168,400

(22) Filed: Oct. 23, 2018

Related U.S. Patent Documents

Reissue of:
(64) Patent No.: 9,493,378
Issued: Nov. 15, 2016
Appl. No.: 14/207,341
Filed: Mar. 12, 2014

U.S. Applications:
(60) Provisional application No. 61/780,626, filed on Mar. 13, 2013.

(51) Int. Cl.

| | |
|---|---|
| ***C04B 41/50*** | (2006.01) |
| ***B01J 21/06*** | (2006.01) |
| ***B01J 35/00*** | (2006.01) |
| ***C04B 41/00*** | (2006.01) |
| ***C04B 41/65*** | (2006.01) |
| ***C04B 111/00*** | (2006.01) |

(52) U.S. Cl.
CPC ..... *C04B 41/5041* (2013.01); *B01J 21/063* (2013.01); *B01J 35/004* (2013.01); *C04B 41/009* (2013.01); *C04B 41/5089* (2013.01); *C04B 41/65* (2013.01); *C04B 2111/00827* (2013.01)

(58) Field of Classification Search
CPC ..... C04B 41/5041; C04B 41/4535; C04B 41/4539; C04B 41/4572; C04B 41/5027; C04B 41/009; C04B 41/5089; C04B 41/65; C04B 2111/00827; B01J 21/063; B01J 35/004; E01C 1/005
See application file for complete search history.

(56) References Cited

U.S. PATENT DOCUMENTS 5,124,182 A * 6/1992 Kubo et al. ..... 427/393.6
5,376,705 A * 12/1994 Leys et al. ..... 523/417
(Continued)

FOREIGN PATENT DOCUMENTS

CA 2836195 A1 3/2006

OTHER PUBLICATIONS

Office Action mailed Feb. 8, 2016 in Canadian Patent Application No. 2845945 filed Mar. 13, 2014.

*Primary Examiner* — Norca L. Torres Velazquez
(74) *Attorney, Agent, or Firm* — Keith Kline; The Kline Law Firm PC

(57) ABSTRACT

Methods for embedding photocatalytic titanium dioxide in concrete surfaces to reduce pollutants via photocatalytic reactions are provided herein. One method includes applying an amount of concrete treatment compound to an upper surface of the concrete, the concrete treatment compound comprising a mixture of a liquid carrier compound with a titanium dioxide ($TiO_2$) photocatalyst.

12 Claims, 3 Drawing Sheets

*AMENDED*

(56) References Cited

U.S. PATENT DOCUMENTS

| | | | | |
|---|---|---|---|---|
| 5,861,205 | A * | 1/1999 | Murata | B01D 53/885 428/141 |
| 6,454,489 | B1 * | 9/2002 | Murata | C04B 14/305 404/17 |
| 6,699,577 | B2 * | 3/2004 | Nonoyama | B01D 53/8637 134/104.1 |
| 6,824,826 | B1 * | 11/2004 | Amadelli | B82Y 30/00 106/286.1 |
| 6,919,104 | B2 * | 7/2005 | Marzolin et al. | 427/385.5 |
| 7,521,039 | B2 * | 4/2009 | Bygott et al. | 423/659 |
| 7,534,754 | B2 * | 5/2009 | Netherton | 510/240 |
| 7,960,042 | B2 * | 6/2011 | Cassar | C04B 14/305 106/713 |
| 2003/0129412 | A1 * | 7/2003 | Nonoyama | B01D 53/8637 428/421 |
| 2007/0155622 | A1 * | 7/2007 | Goodwin | C03C 1/008 502/242 |
| 2008/0003367 | A1 * | 1/2008 | Stratton | B01J 35/004 427/372.2 |
| 2009/0142604 | A1 * | 6/2009 | Imai | B01J 35/004 428/447 |
| 2012/0118318 | A1 * | 5/2012 | Hillebrandt Poulsen | C09D 7/69 134/1.3 |
| 2012/0165186 | A1 * | 6/2012 | Edwards | B82Y 30/00 502/350 |

* cited by examiner

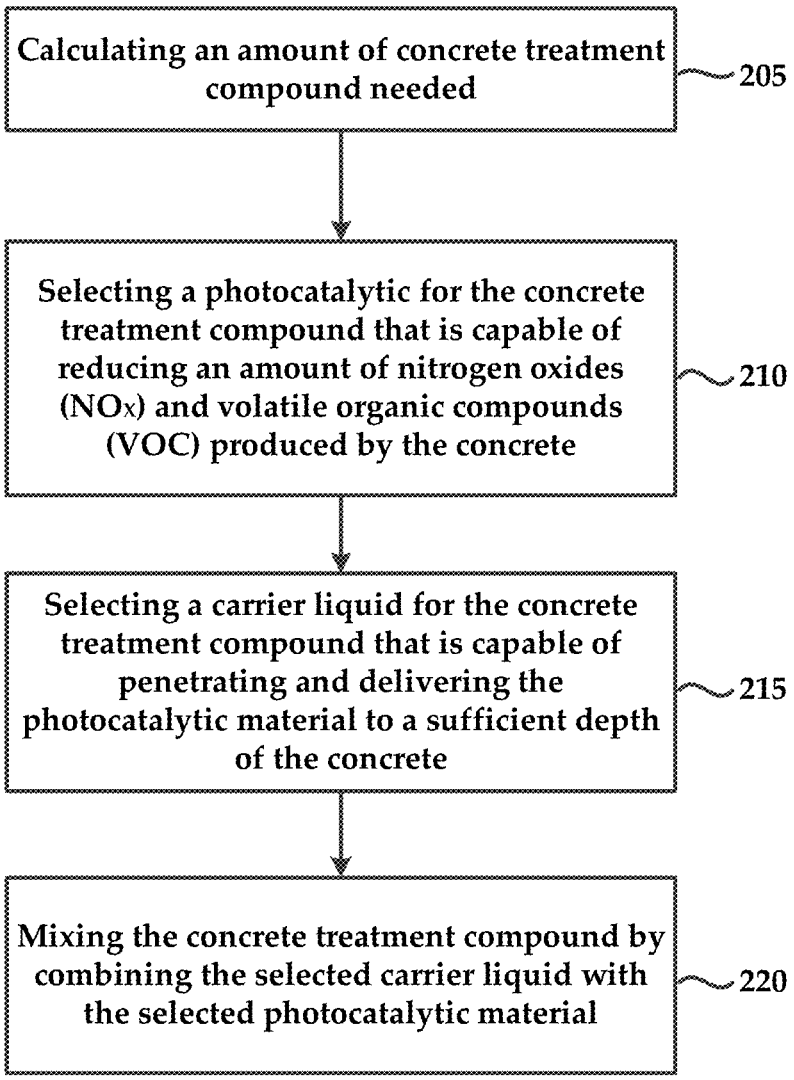
*FIG. 2*
*AMENDED*

METHOD OF EMBEDDING PHOTOCATALYTIC TITANIUM DIOXIDE IN CONCRETE STRUCTURES TO REDUCE POLLUTANTS VIA PHOTOCATALYTIC REACTIONS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[This patent application claims the priority benefit of U.S. provisional patent application No. 61/780,626 filed on Mar. 13, 2013, the disclosure of which is incorporated by reference herein in its entirety.] *This patent application is a reissue of U.S. Pat. No. 9,493,378, originally issued on Nov. 15, 2016, based on U.S. application Ser. No. 14/207,341, filed Mar. 12, 2014 which claims the priority benefit of U.S. provisional patent application No. 61/780,626 filed on Mar. 13, 2013, the disclosure of which is incorporated by reference herein in its entirety.*

FIELD OF THE INVENTION

The present invention relates primarily to concrete road construction, although it can apply to any horizontal or vertical concrete structures. It is a method of impregnating the concrete with a photocatalytic titanium dioxide catalyst that reacts with nitrogen oxides and other pollutants to chemically alter them into non-hazardous or less hazardous materials through photocatalytic oxidation (PCO) and/or reduction reaction.

SUMMARY

In some embodiments, the present technology is directed to a method that includes applying an amount of concrete treatment compound to an upper surface of the concrete, the concrete treatment compound comprising a mixture of a liquid carrier compound with a titanium dioxide ($TiO_2$) photocatalyst.

In some embodiments, the present technology is directed to a method that includes applying a photocatalytic compound to concrete, wherein the photocatalytic compound is capable of uniformly penetrating the concrete down to a depth of at least an eighth of an inch relative to an upper surface of the concrete.

In some embodiments, the present technology is directed to a concrete treatment compound comprising an amount of a carrier liquid mixed with an amount of a photocatalyst, wherein the carrier liquid is capable of penetrating concrete down to a depth of at least an eighth of an inch relative to an upper surface of the concrete.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that are included in the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 2 is a method for preparing the concrete treatment compound that is to be applied to the concrete.

DETAILED DESCRIPTION

Figure 1:
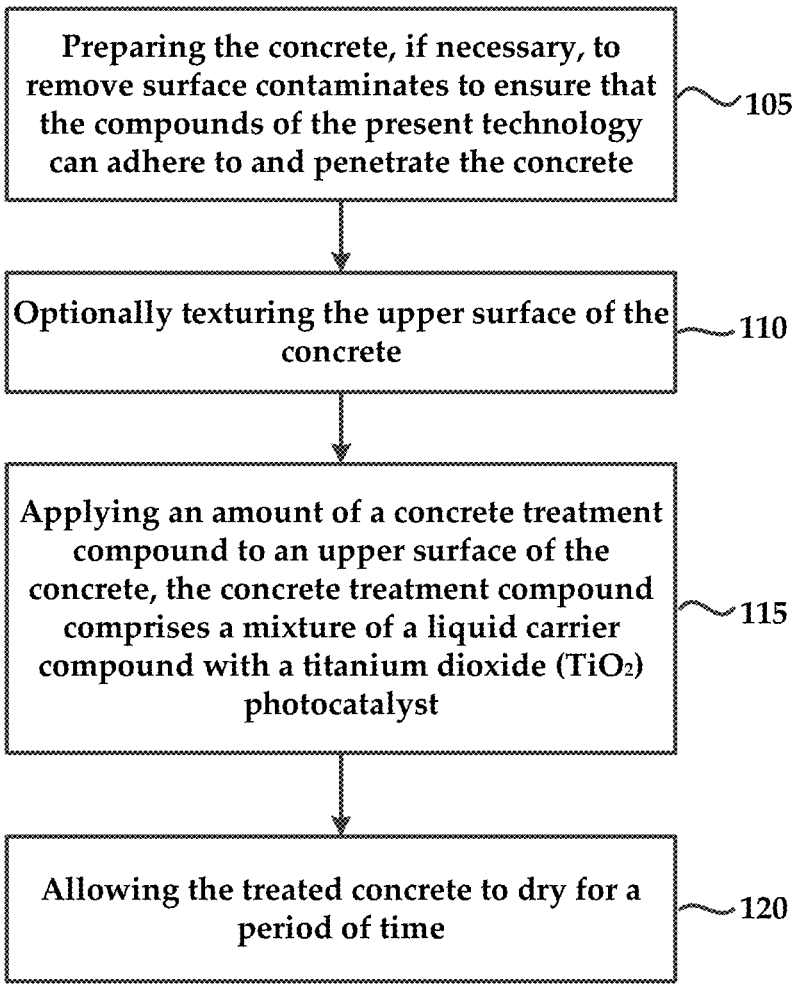
FIG. 1 is a flowchart of an exemplary method of treating concrete to reduce the production of nitrogen oxides ($NO_x$), volatile organic compounds (VOC), and other pollutants [by] *near the surface of* the concrete.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

The present technology is embodied in some instances as a method of embedding photocatalytic $TiO_2$ nanoparticles into horizontal and vertical concrete structures that are either already in place or in the process of curing. It is envisioned that the process may be used for all concrete structures, but particularly those in close proximity to roads and highways. The introduction of $TiO_2$ is by impregnation into concrete structures using specialized multi-purpose concrete curing and preservation products, hereinafter referred to as a "concrete treatment compound".

An advantage of the present technology is that it provides a method of introducing photocatalytic oxidation technology into existing concrete structures, without the prohibitive cost and disruption of removing said structures and replacing them with new concrete.

Another advantage of the present technology is that it provides a method of economically introducing photocatalytic oxidation technology into just the upper layers of freshly placed concrete, eliminating the prohibitive cost of mixing expensive titanium dioxide into the entire concrete mix.

Another advantage of the present technology is that the concrete treatment compounds uniformly impregnate the concrete at depths great enough that normal wear of the upper surfaces will expose underlying photocatalytic reactive layers to the surface, so that the pollution-reducing capability is self-regenerated (e.g., remains consistent or viable) throughout the lifespan of the concrete structure.

Another advantage of the present technology is that the concrete treatment compounds simultaneously seal and harden the concrete and fill voids in its structure to increase resistance to water damage, chloride ion penetration, de-icing salts, and freeze/thaw damage. Sealing of the concrete may also improve long-term photocatalytic performance. Indeed, residual salt and water build-up on traditional concrete structures can interfere with photocatalytic oxidation. These protective effects are provided by a liquid carrier compound, into which the $TiO_2$ is mixed.

The present technology contemplates a method of embedding photocatalytic $TiO_2$ nanoparticles, via delivery using concrete treatment compounds, into horizontal and/or vertical concrete structures that are either already in place or in the process of curing. It is envisioned that the process may be used for all concrete structures, but particularly roads and highways and structures in nearby proximity to them. The introduction of $TiO_2$ is by impregnation into concrete structures using specialized concrete treatment compounds, resulting in the creation of a photocatalytic reactive layer at the surface of the structure and a uniform distribution of $TiO_2$ nanoparticles in the upper layers of the concrete to depths as great as one half (0.5) inches. In some embodiments, the impregnation or embedding of the nanoparticles is uniform and extends to a depth of between approximately one quarter of an inch to approximately one half of an inch relative to an upper surface of the concrete.

For context, $TiO_2$ is an inorganic pigment and semiconductor material that when exposed to ultraviolet (UV) radiation, as from sunlight, expels an electron from the valence band to the conduction band, leaving behind a positively charged hole. In the presence of water, as in atmospheric humidity, these positively charged holes create hydroxyl radicals as shown:

$$OH^- + h^+ \rightarrow {}^*OH.$$

The hydroxyl radicals in turn oxidize nitrogen oxides as follows:

$$NO + {}^*OH \rightarrow NO_2 + H^+$$

$$NO_2 + {}^*OH \rightarrow NO_3^- + H^{+\cdot}$$

Other reduction effects occur with volatile organic compounds (VOC) and some other pollutants. Since $TiO_2$ functions as a catalyst and is not consumed in the reaction, the photocatalytic effect continues. If the $TiO_2$ is in place at the surface of concrete, it removes a significant quantity of $NO_x$ and VOCs from the environment nearest their source. If $TiO_2$ is uniformly impregnated into the concrete to a given depth the pollution-reducing capability of the concrete will automatically and continuously self-regenerate as the surface layers are subjected to the normal wear of traffic and other environmental factors.

Other reduction effect occurs with volatile organic compounds (VOC) and some other pollutants. Since the $TiO_2$ functions as a catalyst and is not consumed in the reaction, the photocatalytic effect can continue. If the $TiO_2$ is in place at the surface of a concrete roadway or other concrete structure in close proximity to the roadway, it removes a significant quantity of $NO_x$ and VOCs from the environment near their source. If $TiO_2$ is uniformly impregnated into the concrete at depth using a liquid carrier compound, the pollution-reducing capability of the concrete will automatically and continuously self-regenerate as the surface layers are subjected to the normal wear of traffic and other environmental factors.

Traditional methods of $NO_x$ reduction (e.g., catalytic converter reduction of motor vehicle emissions) have reached a point of diminishing returns in terms of cost effectiveness, resulting in the need for new and innovative methods of pollutant reduction. A method of reducing these pollutants may be the use of photocatalytic titanium dioxide blended into concrete paving mixtures at the time of construction. This method has not seen widespread acceptance or practical implementation yet for a number of reasons.

One key disadvantage of the method described above is its limitation to usage in freshly placed concrete surfaces, reducing its economic viability for existing roadbeds that are structurally sound, which comprise a large percentage of the roadbeds and structures that would be most subject to violating the forthcoming Environmental Protection Agency (EPA) guidelines. The tremendous cost that would be created by replacing these roadbeds and structures with new concrete would be prohibitive, both in terms of dollar cost and user delays.

The present technology impregnates the concrete with $TiO_2$ by applying specialized proprietary penetrating liquid carriers to the surface of a concrete structure. These carriers are designed and proven to carry chemicals into concrete. The $TiO_2$ is blended into the liquid carriers at a proportion that will result in a uniform distribution of $TiO_2$ nanoparticles throughout the upper one-half (0.5) inch layer of the concrete structure, or to other depths according to road or structure design requirements. As mentioned above, the combination of liquid carrier compound and $TiO_2$ is referred to as a concrete treatment compound.

Examples of liquid carrier compounds that may be used for this purpose are Litho1000Ti (for existing, cured concrete) manufactured by Pavement Technology, Inc. and Lithium Cure Ti (for new concrete that is in the curing process) manufactured by Sinak Corporation.

These carrier compounds have the added benefit of sealing and hardening the concrete and filling voids in its structure to increase resistance to water damage, chloride ion penetration, de-icing salts, and freeze/thaw damage. In some embodiments, an anatase powder form of $TiO_2$ nanoparticles at a specific concentration is combined with the liquid carrier that will result in $TiO_2$ being delivered at the designed rate of application for the impregnated region. To be sure, other penetrating liquid carriers and/or forms of $TiO_2$, other semiconductors or inorganic pigments that are photocatalytic and alternate concentration levels, can be employed as deemed suitable.

In some embodiments the concrete treatment compound comprising the $TiO_2$ additive (or other photocatalytic compound) is sprayed or otherwise applied to horizontal road surfaces by a sprayer applicator with a spray bar of variable length utilizing industry standard nozzles. The application rate is controlled by a computerized flow manager, which allows the carrier compound to be precisely applied to the road surface. Once the flow rate computer has been set to the desired application rate, the application of the carrier compound is very accurate due to the computer control of the flow, regardless of travel speed variations of the sprayer. On vertical surfaces, or other surfaces inaccessible to a sprayer applicator with spray bar, the compound can be applied by hand spraying with a wand, or any other suitable means of application that maintains the required accuracy.

If conditions in a given application dictate that a horizontal concrete surface requires texturing for safety, adhesion or other reasons, abrasive media application methods will be employed prior to spray application of the liquid carrier compounds. Exemplary methods are the Skidabrader process, conventional shot blasting, diamond grinding, water blasting, and the like.

In some embodiments, if the concrete surface is damaged or the surface has an unacceptable slip coefficient (e.g., a surface texture that is likely to cause an individual to slip and fall on the surface) the surface to be treated may be textured using the aforementioned abrasive process, or repaired if necessary.

Additionally, the concrete treatment compounds of the present technology can be applied to a concrete surface without first priming the surface, which is often required for concrete treatment processes such as painting or sealing.

As mentioned above, the amount concrete treatment compound (e.g., carrier compound plus photocatalytic material) that is applied to a concrete surface should be enough to penetrate the concrete down to between a depth range of approximately an eighth of an inch to approximately a half of an inch, inclusive. Further, a concentration of photocatalytic material within the liquid carrier compound should be sufficient to achieve a desired concentration of the photocatalytic material within the concrete surface. This process of delivering concrete treatment compounds is referred to as distributive embedding.

The depth to which the concrete treatment compound should be distributively embedded may depend upon a variety of factors such as the composition and size of the aggregate used to create the concrete or the binder used to hold the aggregate together. By example, the photocatalytic material of the concrete treatment compounds may only need to penetrate up to one quarter of an inch for asphalt cement that includes an aggregate that is small and tightly packed such that it resists wear off, whereas a cement that is known to wear off quickly may require photocatalytic material to be embedded further into the concrete to account for additional wear. Other factors may include expected or average traffic or use patterns that may predict wear off rates, as well as weather information. Other factors that would be apparent to one of ordinary skill in the art are also likewise contemplated for use.

Thus, in some instances, it is required to calculate an amount of concrete treatment compound of the present technology, which will be required to penetrate the concrete surface down to a sufficient depth relative to an upper surface of the concrete surface. The examples of factors that affect wear off may be used as a part of this calculation. For example, if it is determined that based upon concrete composition and traffic pattern that an average wear off of 0.005 inches per year is expected, and the lifespan of the concrete surface is forty years, the concrete treatment compound should be applied so as to penetrate to a depth of at least one quarter of an inch, as the expected wear off would be 0.2 (two tenths) inches over the forty years.

FIG. 1 is a flowchart of an exemplary method of treating concrete to reduce nitrogen oxides ($NO_x$), volatile organic compounds (VOC), and other pollutants.

The method optionally includes preparing 105 the concrete, if necessary, to remove surface contaminates to ensure that the concrete treatment compound can adhere to and penetrate the concrete to the depth required.

In some embodiments, the method optionally includes texturing 110 the upper surface of the concrete. Again, this includes, for example, using an abrasive technique to prepare the surface of the concrete.

The method also comprises applying 115 an amount of concrete treatment compound to an upper surface of the concrete. As mentioned above, the concrete treatment compound comprises a mixture of a liquid carrier compound with a titanium dioxide ($TiO_2$) photocatalyst. In some instances, the $TiO_2$ photocatalyst is an anatase powder form of $TiO_2$ nanoparticles that is mixed into a liquid carrier compound. The liquid carrier compound may include any liquid that can seal and harden concrete and fills voids therein to increase resistance of the concrete to water damage, chloride ion penetration, de-icing salts, freeze/thaw damage, and other deleterious effects.

The method includes allowing 120 the treated concrete to dry for a period of time.

FIG. 2 is a method for preparing the concrete treatment compound that includes calculating 205 an amount of concrete treatment compound that is necessary to ensure that the concrete is penetrated and embedded with photocatalytic material to a sufficient depth.

The method also includes selecting 210 a photocatalytic material for the concrete treatment compound that is capable of reducing an amount of nitrogen oxides ($NO_x$) and volatile organic compounds (VOC).

The method also includes selecting 215 a carrier liquid for the concrete treatment compound that is capable of penetrating and delivering the photocatalytic material to a sufficient depth of the concrete. In some embodiments, the method includes mixing 220 the concrete treatment compound by combining a liquid carrier compound with an amount of the selected photocatalytic material.

Figure 3:
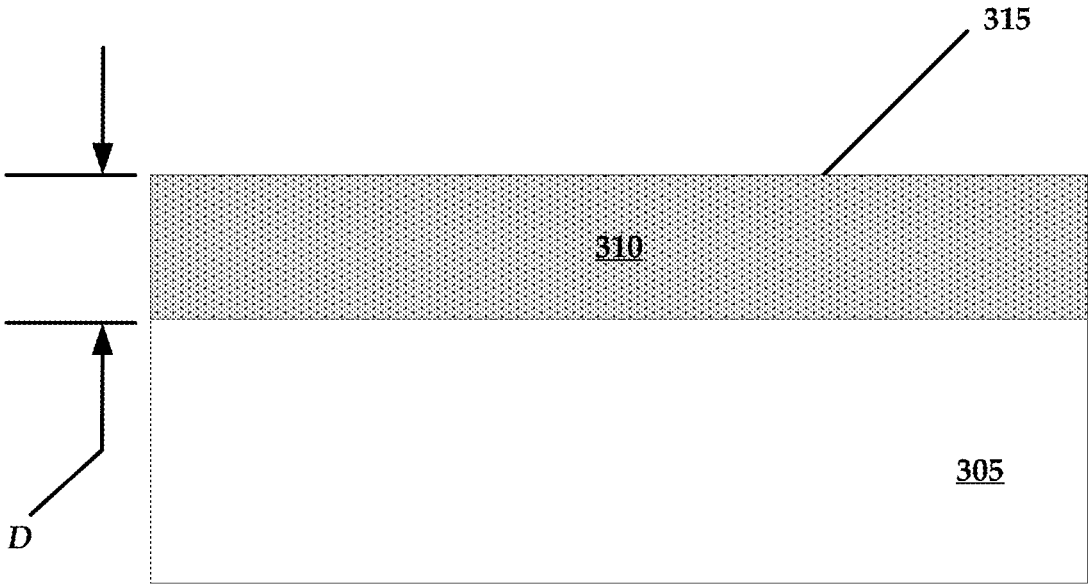
FIG. 3 is a cross sectional view of a treated section of concrete.

FIG. 3 illustrates an asphalt concrete section 305 that has been treated with concrete treatment compound 310. The concrete section 305 is shown as having an upper surface 315. The amount of concrete treatment compound 310 has penetrated down from the upper surface 315 to a depth D. This depth D can range anywhere between at least an eighth of an inch, down to a quarter of an inch. Other depths may also be utilized and can vary according to design requirements and usage.

Other examples of compounds that may be used as carrier liquids include SurfCrete Ti manufactured by Pavement Technology, Inc., and RELAY Ti manufactured by Sinak Corporation. One embodiment of the present technology utilizes an anatase powder form of $TiO_2$ at concentrations of 3% to 5% by weight. Other resurfacing compounds and/or forms of $TiO_2$, and alternate concentration levels, can be employed as deemed suitable.

In some embodiments the compound is applied with squeegees to a concrete surface that has previously been roughened with abrasive media, such as the Skidabrader process, conventional shot blasting, diamond grinding, water blasting, and the like. For thicker applications, the compound is applied in layers, typically nine (9) mils thick, with each layer being allowed to dry before the next layer is applied.

While the present technology has been described in connection with a series of steps, these descriptions are not intended to limit the scope of the technology to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A method for treating a concrete structure, the method comprising: applying an amount of concrete treatment compound to an upper surface of the concrete, the concrete treatment compound comprising a mixture of a liquid carrier compound with a titanium dioxide ($TiO_2$) photocatalyst, the liquid carrier compound carrying the $TiO_2$ photocatalyst into the concrete structure, wherein the liquid carrier compound penetrates the concrete to a depth range of approximately an eighth of an inch to approximately a quarter of an inch, as measured from the upper surface of the concrete, so as to embed the $TiO_2$ photocatalyst therein, and simultaneously seals and hardens the concrete, and fills voids in the concrete so as to increase resistance of the concrete to deleterious effects, the application of the concrete treatment compound to the upper surface of the concrete causing a reduction of pollutants proximate to the concrete, the pollutants including nitrogen oxides and volatile organic compounds, the concrete treatment compound uniformly impregnating the concrete such that normal wear of the upper surface of the concrete exposes an underlying photocatalytic reactive layer of the concrete, so that a pollution-reducing capability of the concrete treatment compound is self-regenerated.

2. The method according to claim 1, wherein the deleterious effects include at least one of water damage, chloride ion penetration, de-icing salts, and freeze/thaw damage.

3. The method according to claim 1, further comprising texturing the upper surface of the concrete.

4. The method according to claim 1, wherein the $TiO_2$ photocatalyst comprises $TiO_2$ nanoparticles that are mixed into the liquid carrier compound.

5. The method according to claim 4, wherein the $TiO_2$ nanoparticles are in an anatase powder form.

6. A method, comprising applying a photocatalytic compound and a liquid carrier compound to concrete, wherein the photocatalytic compound is capable of uniformly penetrating the concrete down to a depth of at least an eighth of an inch relative to an upper surface of the concrete, the application of the photocatalytic compound to the upper surface of the concrete causing a reduction of pollutants proximate to the concrete, the pollutants including nitrogen oxides and volatile organic compounds, the photocatalytic compound uniformly penetrating the concrete such that normal wear of the upper surface of the concrete exposes an underlying photocatalytic reactive layer of the concrete, so that a pollution-reducing capability of the photocatalytic compound is self-regenerated; and the liquid carrier compound is selected such that it simultaneously seals and hardens the concrete and fills voids in the concrete so as to increase resistance of the concrete to deleterious effects.

7. The method according to claim 6, wherein selecting the liquid carrier compound further comprises selecting a first type of carrier liquid if the concrete is fully cured and selecting a second type of carrier liquid if the concrete is not fully cured.

8. The method according to claim 7, further comprising calculating an amount of $TiO_2$ nanoparticles that is necessary to ensure that the concrete is penetrated and embedded with photocatalytic material to a sufficient depth.

9. A method, comprising applying a photocatalytic compound and a liquid carrier compound to concrete, wherein the photocatalytic compound uniformly penetrates the concrete to a depth of at least an eighth of an inch relative to an upper surface of the concrete, the liquid carrier compound including a resurfacing compound that is applied to the concrete using a squeegee, the application of the photocatalytic compound to the upper surface of the concrete causing a reduction of pollutants proximate to the concrete, the pollutants including nitrogen oxides and volatile organic compounds, the photocatalytic compound uniformly penetrating the concrete such that normal wear of the upper surface of the concrete exposes an underlying photocatalytic reactive layer of the concrete, so that a pollution-reducing capability of the photocatalytic compound is self-regenerated.

10. The method according to claim 9, further comprising selecting the liquid carrier compound such that it is configured to simultaneously seal and harden the concrete and fills voids in the concrete so as to increase resistance of the concrete to deleterious effects.

11. The method according to claim 10, wherein selecting the liquid carrier compound further comprises selecting a first type of carrier liquid if the concrete is fully cured and selecting a second type of carrier liquid if the concrete is not fully cured.

12. The method according to claim 11, further comprising calculating an amount of $TiO_2$ nanoparticles that is necessary to ensure that the concrete is penetrated and embedded with photocatalytic material to a sufficient depth.

* * * * *